May 13, 1930. G. H. LEWIS 1,758,526
PLANT PULLER
Filed Oct. 10, 1928

George H. Lewis
Inventor.
By W. E. Smith
Attorney.

Patented May 13, 1930

1,758,526

UNITED STATES PATENT OFFICE

GEORGE H. LEWIS, OF BALTIMORE, MARYLAND

PLANT PULLER

Application filed October 10, 1928. Serial No. 311,586.

This invention relates to plant pullers and more particularly to a device for withdrawing plants from the ground, or removing weeds from lawns where it is desirable to leave the sod or earth undisturbed.

The need for this improvement arises from the fact that in cleaning areas of ground of weeds one custom is to manually pull the weed by the plant growth above the ground and in doing this oftentimes the plant growth breaks off leaving the root in the ground. In most species of weeds when the root is left in the ground the growth of the weed is not permanently destroyed by the part destruction of the foliage and hence the roots will send forth new shoots or branches of foliage. To clear the second growth it is oftentimes necessary to go over the field again thereby entailing extra labor. To overcome this situation it is the object of the invention to provide means whereby the roots and the entire plant growth will be entirely withdrawn from the ground.

A further object of the invention is to provide a strong and durable plant puller which may be operated quickly and easily to remove plants or weeds without marring the ground or leaving holes therein other than those left by the removal of the plants or weeds themselves, which holes will be very small and will not disfigure the ground.

Other objects will appear as the disclosure progresses. The drawings are intended merely to indicate a possible embodiment of the invention. It is obvious therefore that the actual needs of manufacture may necessitate certain mechanical changes. It is therefore not intended to limit the invention to the embodiment illustrated but rather to define such limits in the appended claims.

Figures 1, 2, 3, 4, 5, 6:
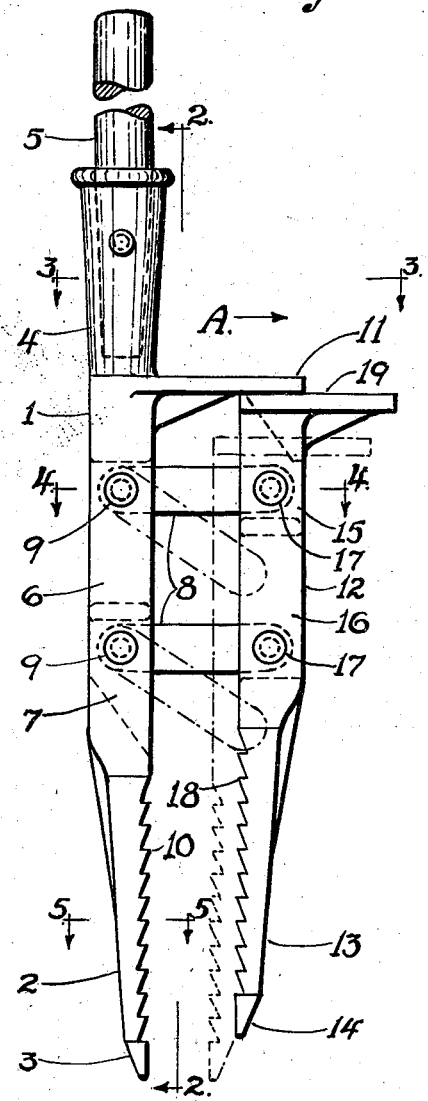
Figure 1 is a side elevation showing the plant puller.
Figure 2 is a section on line 2—2 of Figure 1.
Figure 3 is a section on line 3—3 of Figure 1.
Figure 4 is a section on line 4—4 of Figure 1.
Figure 5 is a section on line 5—5 of Figure 1.
Figure 6 is a view of the movable jaw member looking in the direction of arrow A of Figure 1.

Referring now to the drawings in detail in which like reference characters denote like parts throughout the specification, numeral 1 designates a jaw gripping body having a tapering lower end 2 terminating in a spade shaped portion 3 at its lower extremity. The upper part of the body 1 is provided with a cup 4 to receive the handle 5. In the body 1 slots 6 and 7 are provided to receive one end of the parallel bars 8 which are pivotally fastened to the body by pins 9. Cut on the inner face of the lower end 2 of the body 1 are a series of saw teeth 10. On line with the bottom of the cup 4 and integral with the body is an extension 11 forming a foot tread for a purpose to be later described.

Spaced parallel to the jaw gripping body 1 by the parallel bars 8 is a movable jaw gripping body 12, similar in general design to the body 1 with the exception that the cup and handle are omitted. The movable jaw includes a lower end 13 terminating in a spade shaped portion 14 at its lower end. In the body 12 slots 15 and 16 are provided to receive one end of the parallel bars 8 which are pivotally fastened in place at this end by the pins 17. On the inner face of the lower end 13 are teeth 18 having a similar profile to the teeth 10 of the opposite member 1. Integral with the top of the movable jaw gripping member 12 is an outwardly extending foot tread 19.

The operation of the device is as follows:

The device, in an open position as shown in full lines in Figure 1 is placed with the plant growth between the two jaws and with the spade end 3 touching or resting on the ground. While the operator holds the handle 5 in a vertical position his foot is placed on the foot tread 11 and when a downward pressure is applied thereto the whole device is pushed into the ground to a depth sufficient to grip the plant roots. The operator's foot is then shifted to the foot tread 19 and when a downward pressure is applied thereto and the spade end 14 forced in the earth the parallel bars 8 pivoted to both members 1 and 12 will cause the latter to be drawn inwardly in a parallel plane, as shown in dotted lines in Figure 1 towards the body 1 thereby causing the teeth 10 and 18 to be drawn together and grip the plant's roots.

With the jaws in this position the handle 5 is pulled and the plant extracted from the earth.

As seen in Figures 2 and 6 the spade portions 3 and 14 are made wider than the lower ends 2 and 13. The purpose of this arrangement is to force the earth away from the sides of the body members 1 and 12 and thereby reduce the frictional resistance of the earth when digging into same.

It will thus be seen that I have provided a simple and efficient plant and weed puller which is easy to be operated and has relatively few parts. The spade ends of the device are so arranged that they will enter the earth with the minimum amount of friction. The bars 8 will always keep the members 1 and 12 parallel thus providing an even gripping surface for the plant. The saw tooth construction of the teeth will provide an efficient means for holding the plant.

Having described my invention, I claim:

1. In a plant puller of the class described, the combination of two parallel members, one of said members being movable, foot treads at the top of each of said members, the said foot treads of the movable member adapted to rest underneath the foot tread of the other member, means for reducing the space between said members by moving said movable member downwardly so a plant can be gripped between said members, and a handle attached to one of said members for pulling said gripped plant out of the earth.

2. In a plant puller of the class described, the combination of two members, a set of bars for keeping said members parallel, one of said members being movable and the other member being stationary, foot treads at the top of each of said members, the said foot treads of the movable member adapted to rest underneath the foot tread of the stationary member, means for moving the said movable member towards the stationary member by pushing said movable member downwardly, and a handle attached to said stationary member.

3. In a plant puller of the class described, the combination of two members, foot treads at the top of each of said members, one of said foot treads lying directly above the other, a set of bars pivoted at their ends to said members and adapted to keep said members parallel, one of said members being movable and the other member being stationary, said bars adapted to move said movable member towards the stationary member by pushing said movable member downwardly, and a handle attached to said stationary member.

4. In a plant puller of the class described, the combination of two members, foot treads at the top of each of said members, a set of bars pivoted at their ends to said members and adapted to keep said members parallel, one of said members being movable and the other member being stationary, the said foot tread of the movable member adapted to rest underneath the foot tread of the stationary member, said bars adapted to move said movable member towards the stationary member by pushing said movable member downwardly, a series of teeth cut on the inner faces of said members, the bottom portion of each of said members being wider than the upper portion of said members, and a handle attached to said stationary member.

In testimony whereof I have signed my name to this specification.

GEORGE H. LEWIS.